United States Patent [19]

Speiser

[11] Patent Number: 4,842,494
[45] Date of Patent: Jun. 27, 1989

[54] REFRIGERATOR COMPRESSOR/INTERNAL COMBUSTION ENGINE UNIT OF THE ROTARY PISTON TYPE

[75] Inventor: Josef Speiser, Wasserburg, Fed. Rep. of Germany

[73] Assignees: Wankel GmbH, Berlin, Fed. Rep. of Germany; Aisin Seiki Co., Ltd., Kariya, Japan

[21] Appl. No.: 169,298

[22] Filed: Mar. 17, 1988

[30] Foreign Application Priority Data

Mar. 20, 1987 [DE] Fed. Rep. of Germany ....... 3709106

[51] Int. Cl.$^4$ ............................................. F04C 27/00
[52] U.S. Cl. ....................................... 417/364; 277/27; 277/93 R; 277/81 R; 277/63; 277/65; 418/60; 418/104
[58] Field of Search .................... 123/213; 417/364; 418/60, 61.2, 104; 277/27, 63, 65, 81 R, 93 R

[56] References Cited

U.S. PATENT DOCUMENTS

| | | | |
|---|---|---|---|
| 3,259,113 | 7/1966 | Hamada | 418/60 X |
| 3,688,749 | 9/1972 | Wankel | 418/60 X |
| 4,290,611 | 9/1981 | Sedy | 277/63 X |
| 4,448,428 | 5/1984 | Marsi | 277/65 X |

FOREIGN PATENT DOCUMENTS

| | | | |
|---|---|---|---|
| 136617 | 4/1985 | European Pat. Off. | 418/104 |
| 3503039 | 7/1986 | Fed. Rep. of Germany | 418/104 |
| 32990 | 2/1985 | Japan | 418/104 |

Primary Examiner—Michael Koczo
Attorney, Agent, or Firm—Becker & Becker, Inc.

[57] ABSTRACT

A machine unit which includes a refrigerating compressor and an internal combustion engine of the trochoid type including pistons revolving in a planetary arrangement on eccentrics of the same eccentric shaft, as well as a ventilatable intermediate sealing arrangement provided in a central casing element between the casing elements of the internal combustion engine and the compressor. As disposed between the eccentric of the internal combustion engine and the main bearing, the intermediate sealing arrangement is composed of two slip rings revolving with the shaft; a stationary intermediate element is provided in the central casing element, the slip rings being in continuous sliding contact with the intermediate element with sealing action through insert rings pressed against the intermediate element under gas pressure respectively spring action, one of the slip rings is prevented from axial displacement in the direction towards the eccentric of the internal combustion engine by a shoulder of the shaft; a pin inserted into the shaft and in engagement with an axial groove in the ring, counters any tumbling and staggering movement in rotation; another slip ring is prevented from axial displacement and rotational tumbling and staggering movement by a ball engaging into a recess in the slip ring.

4 Claims, 2 Drawing Sheets

REFRIGERATOR COMPRESSOR/INTERNAL COMBUSTION ENGINE UNIT OF THE ROTARY PISTON TYPE

BACKGROUND OF THE INVENTION

The present invention relates to a machine unit comprising a refrigerating compressor and an internal combustion engine of the trochoid type including pistons revolving in a planetary arrangement on eccentrics of the same eccentric shaft, as well as a ventilatable intermediate sealing means arranged in a central casing element between the casing elements of said internal combustion engine and said compressor, around said eccentric shaft, as well as a main bearing for both machines, with the compressor being taper-bore mounted.

Such machine sets or units are used, for instance, in heat pump systems. In such installations, the casings of the compressor and the internal combustion engine, which are interconnected through the eccentric shaft, must be safely sealed against leakage relative to each other so as to prevent any aggressive refrigerant from penetrating into the power or working compartments of the internal combustion engine. The fact must be considered that loads act upon these intermediate sealing means at pressure levels as high as up to 5 bar and more. Regarding the taperbore mounting arrangement of the compressor there should be noted that tumbling movements of the piston will be avoided. This elimination of an outside bearing for compressor support serves the purpose of reducing the axial extension of this unit while a maximum of compact and space-saving design will be achieved. On the other hand, such an approach is inevitable due to the fact that with the given compressor dimensions the small design of the shaft diameter is due to the small diameter of the pinion.

The published German patent application DT-OS 35 03 039.9-Eiermann dated July 31, 1986, belonging to the assignee of the present invention, describes a bearing and shaft arrangement which can be applied in the afore-described machine unit. This intermediate sealing means is arranged beside the compressor and outside of the main bearing so as to communicate directly with the pressurized compressor compartments. This arrangement entails the disadvantage that the compressor eccentric is spaced from the main bearing by a major distance determined by the axial length of this intermediate sealing means, which involves the risk of tumbling movements of the compressor piston as a result of shaft deflection. Moreover, the main bearing is positioned at the hot engine which is dangerous for its oil supply.

SUMMARY OF THE INVENTION

An object of the present invention is therefore to provide an arrangement of the intermediate bearing which will avoid the afore-described disadvantages so that tumbling movements of the compressor eccentric and piston will be precluded while the lubrication of the main bearing will be improved.

BRIEF DESCRIPTION OF THE DRAWINGS

This object, and other objects and advantages of the present invention, will appear more clearly from the following specification in conjunction with the accompany drawings, in which.

DETAIL DESCRIPTION

Figure 1:
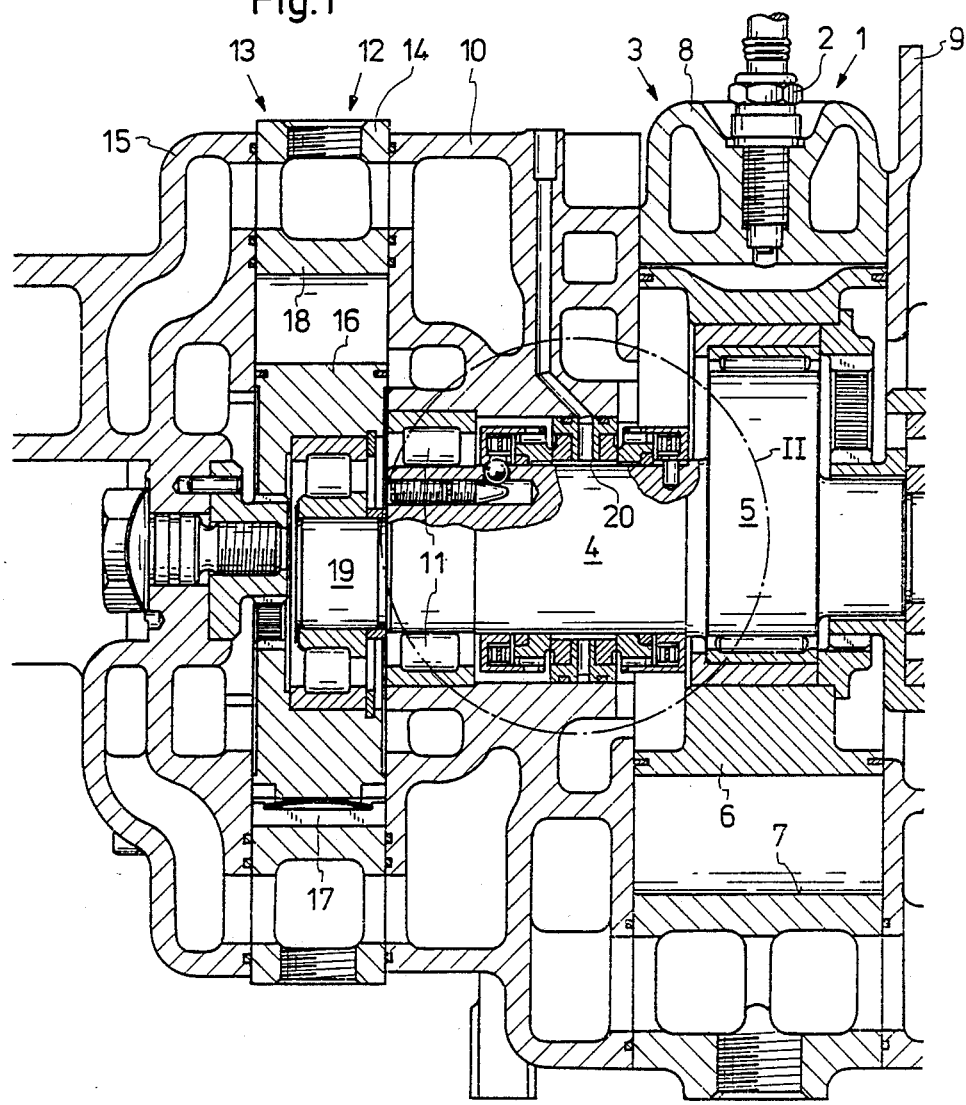
FIG. 1 is a view that shows a partial axial section through a machine unit comprising a refrigerating compressor and an internal combustion engine having features in accordance with the present invention.

In the right part of FIG. 1, a partial section of an internal combustion engine of the trochoid type is illustrated including a double crescent-shaped casing 3, a spark plug 2, therein, a shaft 4 having an eccentric 5 therewith, on which a trochoid piston 6 revolves with continuous sliding contact between its apex sealing means along an inner sliding surface 7 of the double crescent-shaped casing 3. The casing 3 comprises the casing element 8 provided with the inner sliding surface 7 and the right lateral element 9 of which only a segment is shown, wherein one end of the shaft 4 is supported, and the central element 10 in which a left main bearing 11 of the machine is arranged.

The left side of FIG. 1 illustrates a compressor 12 for refrigeration purposes, which is of the trochoid design as well and which includes a casing 13 that comprises a central element 10, a casing element 14 and a left lateral element 15. A triangular piston 16 of this compressor 12 is revolved with continuous sliding contact between the sealing strips 17 arranged at an apex and the inner sliding surface 18 of double-crescent shape, with orbital motion around the eccentric 19 which is cantilever mounted on the shaft 4 outside the main bearing 11. This proximity of the main bearing 11 prevents any tumbling movements of the piston 16. The spacing of the main bearing 11 from the internal combustion engine 1 ensures sufficient lubrication. An intermediate sealing means 20 of the shaft 4 is disposed between the main bearing 11 and the internal combustion engine 1 in the central element 10.

Figure 2:
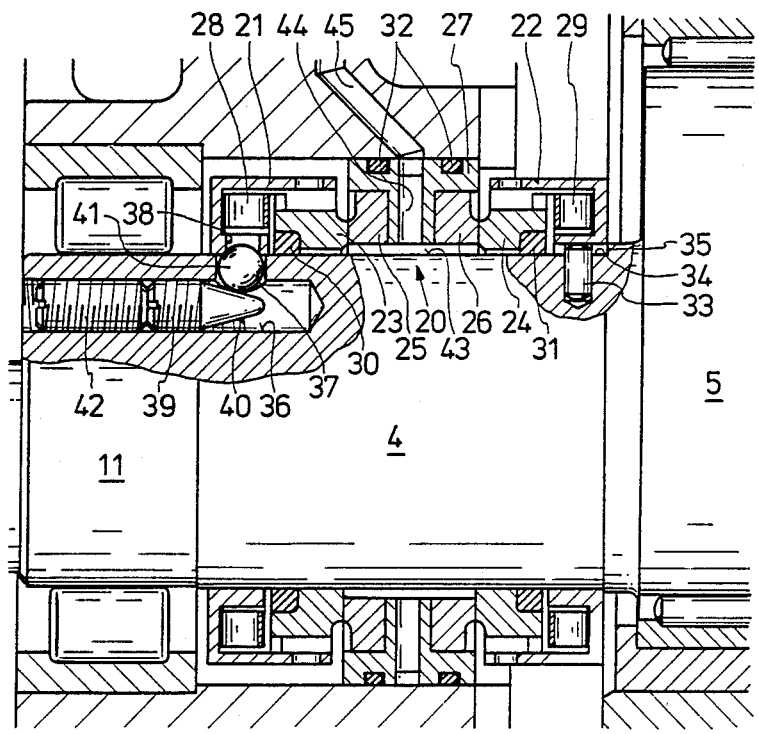
FIG. 2 is an enlarged partial view of the section encircled by circle II in FIG. 1.

As is shown in an enlarged view in FIG. 2, the intermediate sealing means 20 is composed of two symmetrical slip rings 21, 22 which rotate along with the shaft 4 and are provided with insert rings 23, 24 of a sliding material which ensure, in rotation, a continuous sliding contact with insert rings 25, 26 of a sliding material of an intermediate element 27 stationary in the central element, under the action of axially compressing corrugated washers. The following insert rings 23, 24 are sealed from the shaft 4 by the O-rings 30, 31 of the stationary intermediate element 27, and are sealed from the central element 10 by the O-rings 32. Such sealing rings are known per se and are commercially available.

The slip ring 22 is secured against any tumbling and staggering movement in rotation relative to the shaft, by a pin inserted into the shaft 4, which engages into an axial groove 34 in the slip ring 22, while a shoulder 35 in the shaft 4 prevents any axial displacement in the direction towards the eccentric 5.

When the complete intermediate sealing means 20 has been mounted, the other slip ring 21 must be fixed after installation so as to be prevented from any rotation relative to the shaft 4 and from any axial displacement in the direction towards the compressor 12 being cantilever mounted under the action of the corrugated washers 28 and 29. To this end, a bore 36 with a screw thread is axially provided in the shoulder of shaft 4 on the negative side of the eccentric 19 of the compressor 12, which is accessible prior to the introduction of the antifriction bearing of the main bearing 11; this axial bore 36 passes into a radial bore 37 above which a circular opening 36 of the sealing ring 21 is located. A thread bolt 39 is screwed into the bore 36, which carries an integral milled cone 40 at its front side. A steel ball 41 is located in the bore 37, which is pressed into the recess 38 by the cone 40 when the thread bolt 39 is screwed in, so as to fix the sealing ring 21 in the required manner. A safety pin 42 is screwed into the axial bore 36 behind the thread screw 39.

With the machine at rest, the intermediate sealing 20 is maintained in sealed condition under the pressure exerted by the corrugated washers 28, 29. In operation, the pressure in the working chamber of the compressor 12 passing through the main bearing 11 presses the insert ring 23 of the slip ring 21 against the insert ring 25 of the intermediate element 27.

The pressure prevailing in the engine power compartment presses the insert ring 24 against the insert ring 26 of the central element 27 on the other side thereof.

A chamber 43 is provided for collection of leaking oil between the stationary insert rings 25 and 26 and the shaft 4. A bore 44 between the insert rings 25 and 26 opens into this chamber for communicating with the ventilation passage 45 which leads to the upper side of the machine through the central element 10.

The present invention is, of course, in no way restricted to the specific disclosure of the specification and drawings, but also encompasses any modifications within the scope of the appended claims.

What is claimed:

1. A machine unit comprising: a refrigerating compressor and an internal combustion engine of the trochoid type including casing elements therewith and including pistons revolving in a planetary arrangement on eccentric means of an eccentric shaft, in common therewith, as well as a ventilatable intermediate sealing means arranged in a central casing element between the casing elements of said internal combustion engine and said compressor, around said eccentric shaft, and a main bearing located between both machines, with the compressor being cantilever mounted at an end of the eccentric shaft outside of said main bearing, said intermediate sealing means of said eccentric shaft being disposed between said eccentric means of said internal combustion engine and said main bearing.

2. A machine unit according to claim 1, in which said intermediate sealing means is composed of two slip rings revolving with said shaft, and a stationary intermediate element provided in a central casing element, said slip rings being in continuous sliding contact with said intermediate element with sealing action being provided through insert rings which can be pressed against said intermediate element under resilient pressure action, and one of said slip rings being prevented from axial displacement in a direction towards said eccentric means of said internal combustion engine by a shoulder of said shaft; a pin inserted into said shaft and in engagement with an axial groove in said ring, that counters any tumbling and staggering movement in rotation, and furthermore a further slip ring is prevented from axial displacement and rotational staggering by a ball engaging into a recess in said slip ring, which is displaceable in a radial bore of said shaft, while said ball is pressed into said recess by a thread bolt through a cone arranged at its front side, said cone being screwed into an axial bore arranged in said shaft and provided with a screw thread.

3. In a machine unit which includes a refrigerating compressor and an internal combustion engine of the trochoid type including pistons revolving in a planetary arrangement on eccentrics of the same eccentric shaft, as well as a ventilatable intermediate sealing means arranged in a central casing element between the casing elements of said internal combustion engine and said compressor, around said eccentric shaft, as well as a main bearing located between both machines, with the compressor being cantilever mounted at an end of the eccentric shaft outside of said main bearing, the improvement therewith in which said intermediate sealing means of said eccentric shaft is disposed between said eccentric of said internal combustion engine and said main bearing.

4. In a machine unit according to claim 3, in which said intermediate sealing means is composed of two slip rings revolving with said shaft, and a stationary intermediate element is provided in said central casing element, said slip rings being in continuous sliding contact with said intermediate element with sealing action through insert rings which can be pressed against said intermediate element under resilient pressure action, one of said slip rings being prevented from axial displacement in a direction towards said eccentric of said internal combustion engine by a shoulder of said shaft, and a pin inserted into said shaft and in engagement with an axial groove in said ring, so that said pin counters any tumbling and staggering movement in rotation, and so that furthermore the other slip ring is prevented from axial displacement and rotational tumbling and staggering movement by a ball engaging into a recess in said slip ring, which is displaceable in a radial bore of said shaft, while said ball is pressed into said recess by a thread bolt through a cone arranged at its front side, said cone being screwed into an axial bore arranged in said shaft and provided with a screw thread.

* * * * *